United States Patent
Murakami et al.

(10) Patent No.: US 7,060,744 B2
(45) Date of Patent: Jun. 13, 2006

(54) PHOSPHAZENE COMPOSITION

(75) Inventors: Fumiki Murakami, Sodegaura (JP); Jun-ichi Nakahashi, Kimitsu (JP); Atsushi Nanasawa, Sodegaura (JP); Tomoyuki Fujita, Kawasaki (JP)

(73) Assignee: Asahi Kasei Chemicals Corporation, Tokyo (JP)

( * ) Notice: Subject to any disclaimer, the term of this patent is extended or adjusted under 35 U.S.C. 154(b) by 119 days.

(21) Appl. No.: 10/648,375

(22) Filed: Aug. 27, 2003

(65) Prior Publication Data
US 2004/0039134 A1    Feb. 26, 2004

(30) Foreign Application Priority Data

Sep. 13, 2002 (JP) .............................. 2002-268112
Sep. 27, 2002 (JP) .............................. 2002-282670

(51) Int. Cl.
*C08K 5/5399*    (2006.01)
(52) U.S. Cl. ..................... 524/116; 524/117; 524/118; 524/122; 524/138
(58) Field of Classification Search ........ 524/116–118, 524/124, 138, 122
See application file for complete search history.

(56) References Cited

FOREIGN PATENT DOCUMENTS

| | | |
|---|---|---|
| EP | 0 945 478 A1 | 9/1999 |
| JP | 4-198189 | 7/1992 |
| JP | A-08-302124 | 11/1996 |
| JP | A-10-259292 | 9/1998 |
| JP | 2000-198793 | 7/2000 |
| JP | B-3053617 | 7/2000 |
| JP | 2001-98144 | 4/2001 |
| JP | 2002-146146 | 5/2002 |

OTHER PUBLICATIONS

Copy of PCT International Search Report dated Nov. 4, 2003.

*Primary Examiner*—Peter Szekely
(74) *Attorney, Agent, or Firm*—Dickstein, Shapiro, Morin & Oshinsky, LLP.

(57) ABSTRACT

A phosphazene composition which has a content of volatile components of not less than 0.02% by weight and not more than 1.0% by weight when it is heated at 200° C. for 2 hours; is excellent in resistance to hydrolysis, and when the phosphazene composition is added to a resin, there is provided a resin composition which highly maintains the balance of resistance to hydrolysis, flame retardancy and stability of electric characteristics in a high-frequency field of not less than 1 GHz.

16 Claims, No Drawings

PHOSPHAZENE COMPOSITION

TECHNICAL FIELD

The present invention relates to a phosphazene composition excellent in resistance to hydrolysis, and a flame retardant and flame retardant resin composition containing the composition as an active ingredient.

BACKGROUND ART

Since phosphazene compositions have excellent characteristics, they have been studied in various fields and suitably used in a wide variety of the fields. For example, they are proposed for various uses such as flame retardants for polymer materials, rubbers, lubricants, lithium ion batteries, solar batteries, fuel cells, non-combustible electrolytes, battery equipment, releasing agents, releasing films, rough surface forming materials, water repellants, and, besides, fertilizers, medicines such as anticancer medicines, aids inhibitors, and dental materials.

As to the flame retardants, conventional methods for flame retardation of flammable resins include those which comprise adding chlorine compounds, bromine compounds, antimony trioxide or the like to resins. However, these methods are not preferred from the point of view of environmental protection and toxicity, and improvement of flame retarding methods has been demanded. As alternatives to flame retardants devoid of chlorine, bromine and metal oxides; phosphorus-based flame retardants have been investigated. Hitherto, red phosphorus, phosphate esters, condensed phosphate esters, etc. have been used as the phosphorus-based flame retardants, but red phosphorus suffers from the problems in hydrolysis and corrosion of molds due to production of corrosive phosphoric acid. Phosphate esters and condensed phosphate esters have the problems that they must be added in large quantities because of their relatively low phosphorus concentration. This causes deterioration of mechanical properties and thermal properties and increases the cost owing to addition of them in a large quantities. Furthermore, in case they are added to resins, decrease of glass transition temperature of the resins is great and heat resistance thereof is deteriorated. In addition, when they are used for electric or electronic equipment, they are also inferior in resistance to hydrolysis.

On the other hand, phosphazene compounds are desirable because they are high in phosphorus content and relatively superior in heat resistance and resistance to hydrolysis and have excellent flame retardancy. Recently, some proposals have been made of methods for flame retardation of resin composition with phosphazene compounds. Examples of the proposals are: flame retardant resin compositions comprising a styrenic resin-containing thermoplastic resin composition; a phosphazene compound and a polyphenol compound as reported in JP-A-08-302124; and flame retardant epoxy compositions comprising an epoxy resin to which phenoxyphosphazene is added as reported in JP-A-10-259292. These proposals are effective from the viewpoint of imparting flame retardancy. However, when the compositions are to be used in fields which require characteristics such as resistance to hydrolysis and excellent stability of electric characteristics, the above proposals are not satisfactory. Japanese Patent No. 3053617 discloses a phosphazene composition which is lower in volatile content after being heated for 2 hours over a boiling water bath (i.e., JIS-K2246). However, the patent makes no mention of the effect which the content of the volatile components exerts on flame retardancy, resistance to hydrolysis and stability of electric characteristics. The use of the phosphazene composition obtained by the above method is also not sufficient in resistance to hydrolysis and stability of electric characteristics.

As disclosed in the following, any effects of volatile components contained in phosphazene compositions found by the inventors cannot be learned from these conventional technologies. That is, proposals on flame retardancy, resistance to hydrolysis and stability of electric characteristics, taking into consideration the volatile components contained in the phosphazene compositions, cannot be inferred from the conventional technologies, and this technology has for the first time been accomplished by the present invention.

DISCLOSURE OF INVENTION

The present invention provides a phosphazene composition which contains neither a chlorine compound nor any bromine compound and is excellent in moisture resistance, flame retardancy and stability of electric characteristics in high-frequency fields of 1 GHz or higher.

As a result of intensive research conducted by the inventors on the technology to attain the above objectives, it has been found that a phosphazene composition having a content of volatile components within a specific range, when heated at a high temperature of 200° C., is surprisingly excellent in moisture resistance and can give resin compositions excellent in stability of electric characteristics and flame retardancy when it is added to resin compositions.

That is, the present invention includes the following embodiments.

1. A phosphazene composition comprising at least one phosphazene compound, wherein the phosphazene composition has a content of volatile components originated therein of not less than 0.02% by weight and not more than 1.0% by weight based on the total weight of the phosphazene composition when it is heated at 200° C. for 2 hours.
2. A phosphazene composition described in the above 1, wherein the volatile components originated in the phosphazene composition contains at least one member selected from a residual reaction solvent, a residual starting material and a by-product produced from the reaction solvent and/or the starting material, which are present in the composition due to the synthesis reaction of the phosphazene compound.
3. A phosphazene composition described in the above 1 which has a water content of not more than 1000 ppm measured by Karl Fischer's method at 150° C.
4. A phosphazene composition described in the above 1 which has a water content of not more than 650 ppm measured by Karl Fischer's method at 150° C.
5. A phosphazene composition described in the above 1 which contains not less than 95% by weight of cyclic phosphazene compounds based on the total weight of the phosphazene composition.
6. A phosphazene composition described in the above 1 which has a content of one or more residual alkali metal elements of not more than 200 ppm, a content of compounds having a P—OH bond of not more than 1% by weight and a chlorine content of not more than 1000 ppm based on the total weight of the phosphazene composition.
7. A phosphazene composition described in the above 1 which has a content of one or more residual alkali metal elements of not more than 50 ppm, a content of compounds having a P—OH bond of not more than 1% by weight and a chlorine content of not more than 500 ppm based on the total weight of the phosphazene composition.

8. A phosphazene composition described in the above 1, wherein the phosphaze compound has not less than 90% of phenoxy groups as the substituents based on all the substituents and the phosphazene composition has a phosphorus content of 13.0–14.5% by weight based on the total weight of the phosphazene composition.

9. A phosphazene composition described in the above 1 which has a weight retention according to TGA of not higher than 15% by weight at 500° C. when it is heated from room temperature to 600° C. at a heating rate of 10° C./min in an inert gas atmosphere.

10. A phosphazene composition described in the above 1 which has a weight retention according to TGA of not higher than 10% by weight at 500° C. when it is heated from room temperature to 600° C. at a heating rate of 10° C./min in an inert gas atmosphere.

11. A phosphazene composition described in the above 1 which has a bulk density of not lower than 0.45 g/cm$^3$.

12. A flame retardant resin composition which comprises a resin and a phosphazene composition described in any one of above 1–11.

13. A flame retardant resin composition described in the above 12, wherein the resin comprises at least one hardening resin selected from the group consisting of unsaturated polyester resins, vinyl ester resins, diallyl phthalate resins, epoxy resins, cyanate resins, xylene resins, triazine resins, phenolic resins, urea resins, melamine resins, benzoguanamine resins, urethane resins, ketone resins, alkyd resins, furan resins, styrylpyridine resins, silicone resins and synthetic rubbers.

14. A flame retardant resin composition described in the above 12, wherein the resin comprises at least one thermoplastic resin selected from the group consisting of polycarbonates, polyphenylene ethers, polyphenylene sulfides, polypropylenes, polyethylenes, polystyrenes, ABS resins, polyalkylene terephthalates, polyamides, thermotropic liquid crystals and elastomer-containing polystyrenes.

15. A flame retardant resin composition described in the above 12 which has a concentration of phosphorus atom of 0.5–8.0% by weight.

16. A flame retardant resin composition described in the above 12 which is used for parts or casings of electric and electronic equipment used in a high-frequency fields of not less than 1 GHz.

BEST MODE FOR CARRYING OUT THE INVENTION

The present invention will be explained in detail below.

In general, flame retardants such as phosphazene compositions are transported and stored in an atmosphere excluded from the air to some extent. For example, they are contained in a polyethylene inner bag provided in a paper bag, an aluminum inner bag provided in a paper bag or a polyethylene inner bag which is put in a drum can or a flexible container. However, under some transporting and storing conditions, they are often handled in an environment which may be hot and humid. In case they are under these conditions, they absorb moisture causing deterioration of quality. That is, the phosphazene compositions are inferior in storage stability. Resin compositions, prepared using as a starting material the phosphazene composition which has absorbed moisture, are inferior in resistance to hydrolysis and stability of electric characteristics.

It is generally preferred that not only phosphazene compounds, but all flame retardants preferably do not contain volatile components. However, the volatile components specified in the present invention are rather essential components for stabilization of quality. It has been found that phosphazene compositions which show a weight changing rate (i.e., it can be considered to correspond to content of volatile component), when heated at 200° C. for 2 hours, of not less than 0.02% by weight and not more than 1.0% by weight, preferably not less than 0.02% by weight and not more than 0.8% by weight, more preferably not less than 0.04% by weight and not more than 0.8% by weight, are excellent in moisture resistance even under hot and humid conditions, and accordingly they are excellent in electric characteristic stability, namely, in storage stability. The phosphazene compositions of the present invention do not absorb moisture even when they are stored for a long period of time under hot and humid conditions, and are stable in quality. If the content of volatile components is less than 0.02% by weight, water absorption at the time of moisture absorption increases and electric characteristic stability is inferior. On the other hand, if it exceeds 1.0% by weight, stability of electric characteristics and flame retardancy are undesirably inferior, and furthermore, when resin compositions are prepared, the molded pieces blister and the surface appearance tends to be deteriorated.

Phosphazene compounds can generally be obtained by reacting a halogenated phosphorus with ammonium chloride in an organic solvent to obtain a halogenated phosphazene oligomer and further reacting the oligomer with an alkali metal salt of a hydroxy compound in an organic solvent. The organic solvents suitably usable for the synthesis reaction of phosphazene compounds are not particularly limited, and as examples thereof, mention may be made of ether solvents such as tetrahydrofuran and dioxane; aromatic hydrocarbon solvents such as toluene, xylene, trimethylbenzene, ethylbenzene and propyl benzene; halogenated aromatic hydrocarbon solvents such as monochlorobenzene and dichlorobenzene; amide solvents such as dimethylformamide and diethylformamide; and the like. In this synthesis reaction, various low boiling point by-products may be produced depending on the reaction solvents used and the reaction conditions, and they may remain in the final products as volatile components.

The volatile components originated in the phosphazene compositions according to the present invention contain the residual solvents, and low-boiling point residual starting materials such as phenols and alcohols, which are present in the compositions due to the synthesis reaction of the phosphazene compound. The kind of the residual solvents naturally varies depending on the reaction solvents used. Moreover, the volatile components include low-boiling point impurities having unknown structure which are by-products produced from the starting materials or solvents used, or by-products produced by the reaction of the solvents used and the starting materials used, or the like. Examples of the by-products produced from the starting materials are phosphoric acid compounds produced from halogenated phosphorus, and polymerized compounds such as dimerized compounds produced as by-products from starting phenols, alcohols, or the like. Examples of by-products originating from the solvents used are compounds obtained by ring opening reaction in the case of using ether solvents. Examples of the by-products produced by the reaction of the solvents used and the starting materials used are ethers obtained by the reaction of starting phenols or alcohols with solvents.

The water content in the phopshazene compositions according to the present invention is not more than 1000 ppm, preferably not more than 800 ppm, further preferably not more than 650 ppm, further preferably not more than 500 ppm, further preferably not more than 300 ppm. If the water content exceeds 1000 ppm, stability of electric characteristics and resistance to hydrolysis are undesirably inferior.

The phosphazene compounds used in the present invention are disclosed, for example, in James E. Mark, Harry R. Allcock, Robert West, "Inorganic Polymers" Pretice-Hall International, Inc., 1992, p61–p140. As examples thereof, mention may be made of cyclic phosphazene compounds represented by the following formula (1) and/or chain phosphazene compounds represented by the following formula (2):

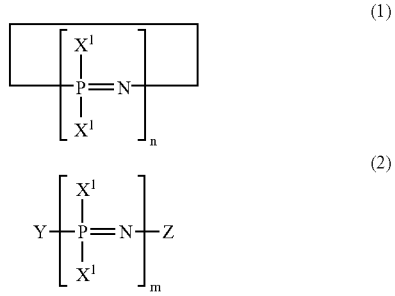

In the above formulas, n is an integer of 3–25, m is an integer of 3–10000, and the substituents $X^1$ and $X^2$ are independently of each other at least one substituent selected from an alkyl group of 1–6 carbon atoms, an aryl group of 6–11 carbon atoms, a fluorine atom, an aryloxy group having a substituent represented by the following formula (3):

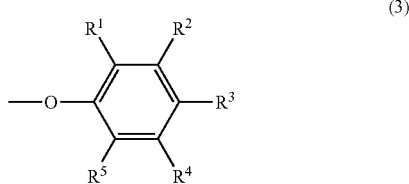

(wherein $R^1$, $R^2$, $R^3$, $R^4$ and $R^5$ independently of each other represent at least one substituent selected from the group consisting of a hydrogen atom, a fluorine atom, an alkyl group or alkoxy group of 1–5 carbon atoms and a phenyl group), a naphthyloxy group, and an alkoxy group or an alkoxy-substituted alkoxy group of 1–6 carbon atoms, and a part or all of hydrogen on the substituent may be substituted with fluorine. Y in the above formula represents —N=P(O)($X^2$) or —N=P($X^2$)$_3$ and Z represents —P($X^2$)$_4$ or —P(O)($X^2$)$_2$.

Examples of the substituents $X^1$ and $X^2$ explained above are alkyl groups such as methyl group, ethyl group, n-propyl group, isopropyl group, n-butyl group, s-butyl group, tert-butyl group, n-amyl group and isoamyl group; aryl groups such as phenyl group, 2-methylphenyl group, 3-methylphenyl group, 4-methylphenyl group, 2,6-dimethylphenyl group, 3,5-dimethylphenyl group, 2,5-dimethylphenyl group, 2,4-dimethylphenyl group, 3,4-dimethylphenyl group, 4-tert-butylphenyl group and 2-methyl-4-tert-butylphenyl group; alkoxy groups such as methoxy group, ethoxy group, n-propyloxy group, isopropyloxy group, n-butyloxy group, tert-butyloxy group, s-butyloxy group, n-amyloxy group, isoamyloxy group, tert-amyloxy group and n-hexyloxy group; alkoxy-substituted alkoxy groups such as methoxymethoxy group, methoxyethoxy group, methoxyethoxymethoxy group, methoxyethoxyethoxy group and methoxypropyloxy group; phenoxy group; alkyl-substituted phenoxy groups and aryl-substituted phenoxy groups such as 2-methylphenoxy group, 3-methylphenoxy group, 4-methylphenoxy group, 2,6-dimethylphenoxy group, 2,5-dimethylphenoxy group, 2,4-dimethylphenoxy group, 3,5-dimethylphenoxy group, 3,4-dimethylphenoxy group, 2,3,4-trimethylphenoxy group, 2,3,5-trimethylphenoxy group, 2,3,6-trimethylphenoxy group, 2,4,6-trimethylphenoxy group, 2,4,5-trimethylphenoxy group, 3,4,5-trimethylphenoxy group, 2-ethylphenoxy group, 3-ethylphenoxy group, 4-ethylphenoxy group, 2,6-diethylphenoxy group, 2,5-diethylphenoxy group, 2,4-diethylphenoxy group, 3,5-diethylphenoxy group, 3,4-diethylphenoxy group, 4-n-propylphenoxy group, 4-isopropylphenoxy group, 4-tert-butylphenoxy group, 2-methyl-4-tert-butylphenoxy group, 2-phenylphenoxy group, 3-phenylphenoxy group and 4-phenylphenoxy group; naphthyl group; naphthyloxy group; etc. A part or all of the hydrogen of these groups may be substituted with fluorine.

As to the phosphazene compositions according to the present invention, the phosphazene compound may be used each alone or as a mixture of two or more thereof. Preferably, the phosphazene compounds having the above-illustrated structures represented as the formulas (1) and (2) are contained in the phosphazene composition in an amount of 95% by weight or more based on the total weight of the composition.

One factor which determines flame retardancy is the concentration of phosphorus atoms contained in the molecule of the phosphazene compound. Among phosphazene compounds, because chain phosphazene compounds having a chain structure have substituents at molecular ends, they are lower in phosphorus content than cyclic phosphazene compounds. Therefore, in the case of adding them in the same amount, it is considered that cyclic phosphazene compounds are higher in flame retardancy imparting effect than chain phosphazene compounds. Accordingly, in the present invention, the phosphazene compositions are preferred, which contain not less than 95% by weight of a cyclic phosphazene compound based on the total weight of the phosphazene composition. Considering the balance of heat resistance and flame retardancy, it is preferred that the phosphaze compound(s) contained in the phosphazene composition have not less than 90% of phenoxy groups as the substituents based on all the substituents in all the phosphazene compound(s).

Furthermore, these phosphazene compounds may be crosslinked with a crosslinking group selected from the group consisting of phenylene group, biphenylene group and a group represented by the formula (4) by the technology disclosed in WO00/09518:

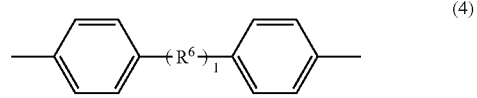

(wherein R⁶ represents —C(CH₃)₂—, —SO₂—, —S— or —O—, and 1 represents 0 or 1). Specifically, the phosphazene compounds having the crosslinked structure are produced by reacting a dichlorophosphazene oligomer with an alkali metal salt of phenol and an alkali metal salt of an aromatic dihydroxy compound. These alkali metal salts are added in somewhat excess of theoretical amount to the dichlorophosphazene oligomer.

Furthermore, the phosphazene compounds are mixtures of phosphazene compounds having different structures, i.e. cyclic phosphazene compounds such as cyclic trimers and cyclic tetramers, and chain phosphazene compounds, and processability of flame retardant resin composition tends to be preferred with increase of the contents of cyclic trimers and cyclic tetramers, and, specifically, phosphazene compounds containing cyclic trimer and/or tetramer compounds in an amount of not less than 80% by weight are preferred. More preferred are those which contain not less than 70% by weight of trimers, and more preferred are those which contain not less than 80% by weight of trimers.

The phosphazene compounds can take various forms such as liquid, wax, solid, etc., although it depends on the kind of substituents and difference of structure, and any forms may be used so long as the effects of the present invention are not damaged. In the case of solid, the bulk density of the phosphazene compounds is preferably not lower than 0.45 g/cm³, and not higher than 0.75 g/cm³. If the bulk density is lower than 0.45 g/cm³, those of small particle diameter are included in a large amount, which may undesirably cause dust explosions.

The content of alkali metal component such as sodium or potassium in the phosphazene compound is preferably not more than 200 ppm, more preferably not more than 50 ppm based on the total weight of the phosphazene composition, respectively, and further preferably the content of all alkali metal components are not more than 50 ppm. Furthermore, it is desired that the content of the phosphazene compounds in which at least one of the substituents $X^1$ in the formula (1) is a hydroxyl group, namely, the phosphazene compound which contains a P—OH bond, is less than 1% by weight, and the chlorine content is not more than 1000 ppm, preferably not more than 500 ppm, most preferably not more than 300 ppm based on the total weight of the phosphazene composition. If the content of the alkali metal component exceeds 200 ppm, and the hydroxyl group-containing phosphazene compound is 1% by weight or more and the chlorine content exceeds 1000 ppm based on the total weight of the phosphazene composition, the resulting resin composition comprising such a phosphazene composition has the problems that it is inferior in flame retardancy and resistance to hydrolysis, and furthermore deteriorates in electric characteristics. Moreover, if such a phosphazene composition is added to a resin which is readily decomposed with an acid, the resin per se is decomposed by the phosphorus acid residue originating from P—OH and mechanical characteristics of the resin composition is sometimes deteriorated.

The phosphazene compound having the cyclic structure represented by the formula (1) and having the substituents $X^1$, at least one of which is a hydroxyl group, can have an oxo structure represented by the following formula (5) (where a+b=n), and it is desired that amount of such oxo compound is also less than 1% by weight based on the total weight of the phosphazene composition like the hydroxyl group-containing phosphazene compound. The same can be applied to the phosphazene compound having the chain structure represented by the formula (2).

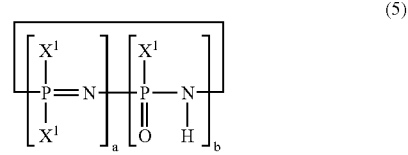

Processes for producing the phosphazene composition of the present invention which has a content of volatile component of not less than 0.02% by weight and not more than 1.0% by weight when it is heated at 200 °C. for 2 hours have no special limitation so long as phosphazene compositions satisfying the requirements can be obtained. For example, the phosphazene composition of the present invention can be suitably obtained by the following processes.

In the synthesis step of the phosphazene compounds, control of by-products is not needed to be severely carried out, and rather presence of the by-products to some extent is suitable for the phosphazene compositions of the present invention. For example, phosphazene compositions containing a proper amount of by-products are obtained by proper control of water content in the reaction system, purity of the starting materials, reaction temperature, reaction time, and the like.

It is necessary to properly control solvents used for purification, temperature and time in the purification step, and the kind of drying apparatus, drying temperature, drying time, degree of pressure reduction, surface area of the phosphazene compound, etc. in the drying step. It is only by controlling these conditions in all the steps that the phosphazene composition of the present invention can be produced.

The phosphazene compositions of the present invention can be suitably used in a wide variety of the fields, and the method of use and field of use are not particularly limited. As suitable methods of use, there are proposed, for example, flame retardants, rubbers, lubricants, lithium ion batteries, solar batteries, fuel cells, non-combustible electrolytes, battery equipment, releasing agents, releasing films, rough surface forming materials, water repellants, and in addition, fertilizers, medicines such as anticancer medicines, aids inhibitors, dental materials, etc. They are suitably usable for all these uses, and particularly suitable are flame retardants for polymer materials, lubricants, lithium ion batteries, solar batteries, fuel cells, non-combustible electrolytes, battery equipment, and releasing films.

In using the phosphazene composition of the present invention, known flame retardants of non-halogen type and non-antimony type can be used in combination with the phosphazene composition as long as the effects of the present invention are exerted. Examples of these additional flame retardants are phosphate esters such as triphenyl phosphate, tricresyl phosphate, trixylenyl phosphate, cresyldiphenyl phosphate, xylenyldiphenyl phosphate, dixylenylphenyl phosphate, resorcinol bisphosphate, and bisphenol A bisphosphate; metal hydroxides such as magnesium hydroxide, aluminum hydroxide and calcium aluminate; nitrogen-containing compounds such as triazine compound, melamine, melamine cyanurate, melamine resin and guanidine compound; zinc borate compounds; zinc stannate compounds; inorganic silicon compounds such as silica, kaolin clay and talc; silicon-containing organic compounds.

In using the phosphazene composition of the present invention, other additives, e.g., stabilizers such as plasticizers, antioxidants and ultraviolet absorbers, hardeners, hardening accelerators, antistatic agents, stress relaxing agents, releasing agents, flow control agents, dyes, sensitizing agents, pigments for coloration, rubber-like polymers, electroconductive polymers, etc. can be previously added in order to impart other characteristics such as rigidity and dimensional stability, so long as the effects of the present invention are not adversely affected.

The phosphazene composition of the present invention can be used in combination with conventionally known resins. The resins usable are not limited, and known hardening resins and plastic resins can suitably be used. The plastic resins include, for example, polycarbonate, polyphenylene ether, polyphenylene sulfide, polypropylene, polyethylene, polystyrene, high-impact polystyrene, elastomer-containing polystyrene, syndiotactic polystyrene, ABS resin, alloy of polycarbonate and ABS resin, polyalkylene terephthalates such as polybutylene terephthalate, polyethylene terephthalate, and polypropylene terephthalate, polyamide, thermotropic liquid crystal, etc. Especially preferred are polyphenylene ether, polystyrene, alloy of polyphenylene ether and polystyrene, alloy of polyphenylene ether and polyamide, alloy of polyphenylene ether and thermotropic liquid crystal and alloy of polyphenylene ether and polyphenylene sulfide.

The hardening resins include, for example, unsaturated polyester resins, vinyl ester resins, diallyl phthalate resins, epoxy resins, cyanate resins, xylene resins, triazine resins, phenolic resins, urea resins, melamine resins, benzoguanamine resins, urethane resins, ketone resins, alkyd resins, furan resins, styrylpyridine resins, silicone resins and synthetic rubbers. Especially preferred are epoxy resins.

These plastic resins and hardening resins may be used alone or as polymer alloys containing two or more of them or polymer alloys of these resins with rubber-like polymers.

The epoxy resins suitably usable in the present invention may be compounds having at least two epoxy groups in the molecule, and are not particularly limited. Examples of the epoxy resins are bisphenol A type epoxy resins, bisphenol F type epoxy resins, bisphenol S type epoxy resins, resorcinol type epoxy resins, novolak type epoxy resins, biphenyl type epoxy resins, polyfunctional type epoxy resins, etc. These epoxy resins can be used alone or as a mixture of two or more.

As the polyphenylene ether resins suitably usable in the present invention, there may be used homopolymers or copolymers having a repeating unit represented by the following formulas (6) and/or (7):

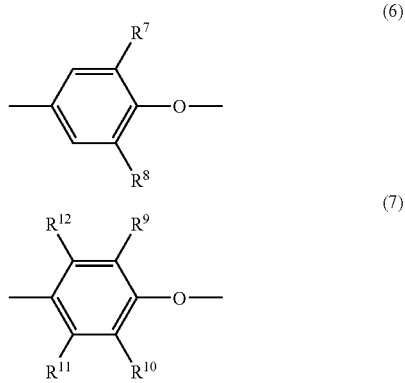

(where $R^7$, $R^8$, $R^9$, $R^{10}$, $R^{11}$ and $R^{12}$ independently of one another represent an alkyl group of 1–4 carbon atoms, an aryl group, halogen or hydrogen, with a proviso that $R^{11}$ and $R^{12}$ cannot be simultaneously hydrogen).

Typical examples of the homopolymers of polyphenylene ether resins are poly(2,6-dimethyl-1,4-phenylene) ether, poly(2-methyl-6-ethyl-1,4-phenylene) ether, poly(2,6-diethyl-1,4-phenylene) ether, poly(2-ethyl-6-n-propyl-1,4-phenylene) ether, poly(2,6-di-n-propyl-1,4-phenylene) ether, poly(2-methyl-6-n-butyl-1,4-phenylene) ether, poly (2-ethyl-6-isopropyl-1,4-phenylene) ether, poly(2-methyl-6-hydroxyethyl-1,4-phenylene) ether, etc.

Among them, poly(2,6-dimethyl-1,4-phenylene) ether is preferred, and polyphenylene ethers containing, as a partial structure, 2-(dialkylaminomethyl)-6-methylphenylene ether units, 2-(N-alkyl-N-phenylaminomethyl)-6-methylphenylene ether units, or the like, which are disclosed in JP-A-63-301222, are especially preferred.

The polyphenylene ether copolymers are copolymers having a phenylene ether structure as the main monomer unit. Examples of the copolymers are copolymer of 2,6-dimethylphenol and 2,3,6-trimethylphenol, copolymer of 2,6-dimethylphenol and o-cresol, copolymer of 2,6-dimethylphenol, 2,3,6-trimethylphenol and o-cresol, and the like.

In the present invention, there can be used modified polyphenylene ether resins obtained by modifying a part or the whole of the polyphenylene ether resin with a group containing carboxyl group, epoxy group, amino group, hydroxyl group, mercapto group or silyl group. These may be used each alone or in a combination of two or more. The modified polyphenylene ether resins rendered functional are produced by the processes disclosed, for example, in JP-A-63-503392, JP-B-7-5818, JP-B-3-6185, JP-A-2001-302738, JP-A-2001-302789, Japanese Patent No. 3289715, Japanese Patent No. 3109735, Japanese Patent No. 3403179, Japanese Patent No. 3409035, etc.

In the resin compositions comprising the phosphazene compositions of the present invention, conventionally known flame retardants of the non-halogen type or the non-antimony type may be contained in addition to the phosphazene compounds of the present invention in such a range as is capable of attaining the effects of the present invention. Examples of these flame retardants are phosphate esters such as triphenyl phosphate, tricresyl phosphate, trixylenyl phosphate, cresyldiphenyl phosphate, xylenyldiphenyl phosphate, dixylenylphenyl phosphate, resorcinol bisphosphate, and bisphenol A bisphosphate; metal hydroxides such as magnesium hydroxide, aluminum hydroxide and calcium aluminate; nitrogen-containing compounds such as triazine compound, melamine, melamine cyanurate, melamine resin and guanidine compound, silicon-containing compounds, etc.

Furthermore, when rigidity or dimensional stability of the resin compositions comprising the phosphazene compositions of the present invention must be improved, inorganic fillers can be added. The fillers can be optionally chosen depending on the purpose. Generally used fillers are glass fibers, potassium titanate fibers, glass cloths, glass flakes, carbon fibers, mica, talc, silica, zircon, alumina, quarts, magnesite, graphite, fullerene, gypsum, kaolin, silicon carbide, calcium carbonate, iron powders, copper powders, etc.

To the resin composition comprising the phosphazene compositions of the present invention, so long as the effects of the present invention are not damaged, there may be added other additives, e.g., stabilizers such as plasticizers, antioxidants and ultraviolet absorbers, hardeners, hardening accelerators, antistatic agents, stress relaxing agents, releasing agents, flow control agents, dyes, sensitizing agents, pigments for coloration, rubber-like polymers, etc. in order to impart other characteristics such as dimensional stability. Moreover, the flame retardency can be further improved by adding various known flame retardants and flame retarding aids, for example, alkali metal hydroxides or alkaline earth metal hydroxides such as magnesium hydroxide and aluminum hydroxide containing water of crystallization, zinc borate compounds, zinc stannate compounds, and inorganic silicon compounds such as silica, kaolin clay and talc.

The methods for blending the phosphazene composition with resin in the present invention has no special limitation so long as the method can attain the effects of the present invention. All of the phosphazene composition, the resin and the additives as required can be blended simultaneously, or after the phosphazene composition and the additives are previously blended, the resin may be added thereto. Alternatively, these components may be blended successively.

The methods for blending the phosphazene composition with thermoplastic resin in the present invention has no special limitation so long as the method can attain the effects of the present invention. For example, the method can be carried out by kneading with the use of kneading machines such as extruders, heating rolls, kneaders, and Banbury mixers. Among them, kneading by an extruder is preferred from the point of productivity. The kneading temperature may be in accordance with preferred processing temperature of the base resin, and a standard kneading temperature is 200–360° C., preferably 240–320° C.

When the phosphazene composition may be blended with a hardening resin, the components for preparation of the resin composition are mixed using no solvent or, if necessary, using a solvent capable of uniformly mixing them, then the solvent is removed to obtain a resin mixture. And the mixture may be poured into a mold and hardened, followed by cooling and removing the hardened mixture from the mold to obtain a molded article. Furthermore, the mixture is poured into a mold and can be hardened by a hot press. The solvent for dissolving the components is not particularly limited so long as they can be uniformly mixed and the effects of the present invention are not damaged in use. Examples of the solvents are toluene, xylene, acetone, methyl ethyl ketone, diethyl ketone, cyclopentanone, cyclohexanone, dimethylformamide, methyl cellosolve, methanol, ethanol, n-propanol, iso-propanol, n-butanol, n-pentanol, n-hexanol, cyclohexanol, n-hexane, n-pentane, etc.

In addition, mention may be made of a method which comprises producing the resin composition by kneading using a kneading machine such as heating rolls, a kneader, a Banbury mixer, an extruder, or the like, then cooling and grinding the resulting composition, and then molding the composition by transfer molding, injection molding, compression molding, or the like. The hardening method varies depending on the hardener used, but is not particularly limited. For example, heat hardening, light hardening, pressure hardening, moisture hardening, and the like can be mentioned. The methods are not limited so long as the effects of the present invention can be attained. The order of mixing the components is not particularly limited so long as the method can attain the effects of the present invention. As the method for producing the resin composition, there may be employed a preferred method depending on the suitability for the resin used.

The resin compositions prepared using the phosphazene composition of the present invention are suitably usable for electric and electronic parts such as coil bobbins, fly-back transformers, connectors and deflecting yokes, electric and electronic materials such as printed wiring boards, printed circuit boards, sealers, electrical insulating materials, electrical coating agents, laminated sheets, varnishes for high speed operation, front composite materials, electric wires, aerial materials, cables, and high performance molding materials, paints, adhesives, coating materials, tableware, buttons, fiber and paper treating agents, decorative laminates, UV hardening inks, sealants, synthetic leathers, thermal insulating cushioning materials, coating film waterproofing materials, corrosion preventing linings, binders for mold, modifying materials for lacquers, paints and inks, resin modifying materials, aircraft interior parts, matrixes for composite materials, utensils, OA equipment, AV equipment, battery equipment, lighting fixtures, automobile parts, housings, ETC, ITC, portable telephones, etc.

EXAMPLES

The present invention will be explained specifically by the following examples, which should not be construed as limiting the invention in any manner.

1) Measurement of Content of Volatile Component:

Five grams of a phosphazene composition was weighed and put in a glass bottle, and heated for 2 hours in an oven preset at 200° C. The change of weight before and after heating was measured, and the difference was taken as a content of the volatile components.

2) Measurement of Water Content in the Phosphazene Composition:

The water content was measured by Karl Fischer's method at a preset temperature of 150° C.

3) Measurement of Water Content in the Phosphazene Composition After Absorbing Moisture:

Previously, the phosphazene composition was put through a sieve having openings of 710 μm, and 10 g of the phosphazene composition which passed through the sieve was put in a laboratory dish and moistened for 6 hours in a thermo-hygrostat under the conditions of a temperature of 85° C. and a relative humidity of 95% RH, and water contents before and after moistening were measured at a preset temperature of 150° C. by the Karl Fischer's method.

4) Bulk Density of the Phosphazene Composition:

An aerated bulk density was measured using a powder tester manufactured by Hosokawa Micron Co., Ltd., and this was taken as bulk density.

5) Electric Characteristics (Stability of Electric Characteristics):

Using a molded piece of 120×120 mm with a thickness of about 2 mm, a relative dielectric constant and a relative dielectric loss tangent thereof were measured at a frequency of 4 GHz by a cylindrical cavity resonator.

Furthermore, the molded piece was moistened for 48 hours in a thermo-hygrostat set at 90° C. and a relative humidity of 95% RH, and thereafter a relative dielectric constant and a relative dielectric loss tangent of the molded piece were measured at a frequency of 4 GHz by a cylindrical cavity resonator.

6) TGA (Thermogravimetric Analysis):

Ten milligrams of the phosphazene composition was heated to 600° C. at a rate of 10° C./min in a nitrogen stream of 30 ml/min using Thermal Analysis System 7 Series manufactured by Perkin-Elmer Co., Ltd., and the weight at 500° C. was divided by the weight at 100° C. and the quotient was multiplied by 100. The resulting value was taken as a weight retention rate at 500° C.

7) Flame Retardancy:

Measurement was conducted on an injection molded test piece of 1/16 inch in thickness by UL-94 vertical flame test, and an average firing time was obtained when the test piece was allowed to contact flames ten times. Evaluation was conducted on whether or not an absorbent cotton caught fire due to the dropping materials during the firing.

8) MFR (Melt Flow Rate):

This was measured at 250° C. and under a load of 10 kg in accordance with JIS K7210.

9) Measurement of Metal Content:

Concentrated sulfuric acid was added to a sample to incinerate it, and the incinerated sample was dissolved in dilute nitric acid, followed by carrying out the quantitative analysis of potassium and sodium by an atomic absorption spectrometer, respectively.

10) Measurement of Phosphorus Content:

About 100 mg of a sample was weighed, and concentrated sulfuric acid was added thereto to incinerate the sample, and the incinerated sample was dissolved in dilute nitric acid, followed by carrying out the quantitative analysis of phosphorus by ICP-AES method.

11) Measurement of Chlorine Content:

The chlorine content was measured by ion chromatography method.

12) Moisture Resistance:

A molded piece of 50×50 mm with a thickness of about 2 mm was moistened for 56 hours in a thermo-hygrostat at a preset temperature of 85° C. and a relative humidity of 95% RH, and the difference in weight before and after moistening was measured and this was taken as a water absorption rate. Furthermore, the change of color of the test piece was visually noted. When substantially no change of color was seen, before and after the moistening, this was indicated by "○". When change of color was seen, this was indicated by "x". Color stability in the case of moisture absorption was thus evaluated.

The components used in the following examples and comparative examples are as follows:

(1) Polyphenylene Ether (PPE)

Poly-2,6-dimethyl-1,4-phenylene ether having a η sp/c of 0.54 measured in a chloroform solution of 30° C.

(2) Rubber-Reinforced Polystyrene (HIPS)

A rubber-reinforced polystyrene having a rubber content of 9% by weight, a η sp/c of matrix polystyrene of 0.64 measured in a toluene solution at 30° C., and a volumetric average rubber particle diameter of 1.5 μm.

(3) Epoxy Resin

AER250 (manufactured by Asahi Kasei Epoxy Co., Ltd.): epoxy equivalent 184–186.

(4) Hardener m-Xylene-α,α'-diamine (manufactured by Wako Pure Chemical Industries, Ltd.)

The phosphazene compositions were synthesized by the processes of Examples 1–6 and Comparative Examples 1–3.

Example 1

FR1: 160.2 g of phenol, 112.2 g of solid potassium hydroxide and 500 ml of xylene were charged in a 2 L four-necked flask equipped with Dean Stark tube with a Dimroth condenser tube, a dropping funnel, a thermometer, and a stirrer, and refluxed with heating at an oil bath temperature of 145° C. in a nitrogen stream. Water produced was taken out of the system by azeotropy with xylene, and only the xylene was returned to the system. Refluxing with heating was carried out until distillation of the produced water terminated. Completion of the reaction required 4 hours.

The reaction vessel was dipped in an ice bath and cooled until the reaction mixture reached 10° C. or lower, and then a mixed solution of 72.1 g of chlorophosphazene oligomer (trimer: 95%, tetramer: 4%, other components: 1%) and 250 ml of xylene was added dropwise to the reaction mixture over a period of 30 minutes using the dropping funnel while keeping the reaction mixture at 10° C. or lower. After the addition of the mixed solution, the reaction mixture was again heated and refluxed with heating at an oil bath temperature of 145° C. for 7 hours. The end point of the reaction was traced by $^{31}$PNMR(phosphorus-31 nuclear magnetic resonace), and the reaction was carried out until the signal originating from the halogen-substituted phosphazene compound was not observed. After completion of the reaction, the reaction mixture was cooled to 80° C., and washed twice with a 10% aqueous sodium hydroxide solution, once with dilute hydrochloric acid, and four times with water while keeping the temperature at 70–85° C. The reaction mixture was dried with anhydrous magnesium sulfate, then magnesium sulfate was removed by filtration, and the solvent was distilled off at 80° C. under 10 mmHg or lower, followed by drying under reduced pressure for 5 hours in an oven with a preset temperature of 105° C. under 1 mmHg or lower to obtain 132.5 g of a phenoxyphosphazene mixture. The resulting bulk phosphazene composition was ground by a Henschel mixer. The composition of the thus obtained phosphazene was obtained by $^{31}$PNMR. The results were as follows. Trimer: 96%, tetramer: 3%, other phosphazene compounds: 1%, content of K: 23 ppm, content of Na: 12 ppm, content of phosphorus: 13.4%, content of chlorine: 30 ppm, residues at 500° C.: 2.2% by weight, and content of volatile components: 0.174% by weight. The bulk density was 0.46 g/cm$^3$.

Example 2

FR2: 151.5 g of phenol, 103.6 g of solid potassium hydroxide and 500 ml of xylene were charged into a 2 L four-necked flask equipped with Dean Stark tube, with a Dimroth condenser tube, a dropping funnel, a thermometer, and a stirrer, and refluxed with heating at an oil bath temperature of 145° C. in a nitrogen stream. Water produced was taken out of the system by azeotropy with xylene, and only the xylene was returned to the system. Refluxing with heating was carried out until distillation of the produced water terminated. Completion of the reaction required 4 hours.

The reaction vessel was dipped in an ice bath and cooled until the reaction mixture reached 10° C. or lower, and then a mixed solution of 70.0 g of chlorophosphazene oligomer and 250 ml of xylene was added dropwise to the reaction mixture over a period of 30 minutes using the dropping funnel while keeping the reaction mixture at 10° C. or lower. After the addition of the mixed solution, the reaction mixture was again heated and refluxed with heating at an oil bath temperature of 145° C. for 7 hours. The end point of the reaction was traced by $^{31}$PNMR, and the reaction was carried out until the signal originating from the halogen-substituted phosphazene compound was not observed. After completion of the reaction, the reaction mixture was cooled to 80° C., and washed twice with a 10% aqueous sodium hydroxide solution, once with dilute hydrochloric acid, and four times with water while keeping the temperature at 70–85° C. The reaction mixture was dried with anhydrous magnesium sulfate, then magnesium sulfate was removed by filtration, and the solvent was distilled off at 80° C. and under 10 mmHg or lower, followed by drying under reduced pressure for 5 hours in an oven with a preset temperature of 105° C. under 1 mmHg or lower to obtain 126.3 g of a mixture of phenoxyphosphazene compounds. The resulting bulk phosphazene composition was ground by a Henschel mixer. The composition of the thus obtained phosphazene was obtained by $^{31}$PNMR. The results were as follows. Trimer: 88%, tetramer: 8%, other phosphazene compounds: 4%, content of K: 20 ppm, content of Na: 11 ppm, content of phosphorus: 13.7% by weight, content of chlorine: 82 ppm, residues at 500° C.: 6.3% by weight, and content of volatile components: 0.225% by weight. The bulk density was 0.47 g/cm$^3$.

Example 3

FR3: 158.0 g of phenol, 110.0 g of solid potassium hydroxide and 500 ml of chlorobenzene were charged in a 2 L four-necked flask equipped with Dean Stark tube with a Dimroth condenser tube, a dropping funnel, a thermometer, and a stirrer, and refluxed with heating at an oil bath temperature of 145° C. in a nitrogen stream. Water produced was taken out of the system by azeotropy with chlorobenzene, and only the chlorobenzene was returned to the system. The refluxing with heating was carried out until distillation of the produced water terminated. Completion of the reaction required 6 hours.

The reaction vessel was dipped in an ice bath and cooled until the reaction mixture reached 10° C. or lower, and then a mixed solution of 72.1 g of chlorophosphazene oligomer and 250 ml of chlorobenzene was added dropwise to the reaction mixture over a period of 30 minutes using the dropping funnel while keeping the reaction mixture at 10° C. or lower. After the addition of the mixed solution, the reaction mixture was again heated and refluxed with heating at an oil bath temperature of 145° C. for 7 hours. The end point of the reaction was traced by $^{31}$PNMR, and the reaction was carried out until the signal originating from the halogen-substituted phosphazene compound was not observed. After completion of the reaction, the reaction mixture was cooled to 80° C., and washed twice with a 10% aqueous sodium hydroxide solution, once with dilute hydrochloric acid, and four times with water while keeping a temperature of 70–85° C. The reaction mixture was dried with anhydrous magnesium sulfate, then magnesium sulfate was removed by filtration, and the solvent was distilled off at 80° C. and under 10 mmHg or lower, followed by drying under reduced pressure for 5 hours in an oven with a preset temperature of 105° C. under 1 mmHg or lower to obtain 121.8 g of a mixture of phenoxyphosphazene compounds. The resulting bulk phosphazene composition was ground by a Henschel mixer. The composition of the thus obtained phosphazene was obtained by $^{31}$PNMR. The results were as follows. Trimer: 84%, tetramer: 14%, other phosphazene compounds: 2%, content of K: 30 ppm, content of Na: 15 ppm, content of phosphorus: 13.5%, content of chlorine: 65 ppm, residues at 500° C.: 7.1% by weight, and content of volatile components: 0.586% by weight. The bulk density was 0.55 g/cm³.

Example 4

FR4: FR1 was dissolved in a mixed solvent of toluene/methanol=10/90, and then recrystallized. The resulting crystals were dried under reduced pressure for 4 hours in an oven with a preset temperature of 105° C. under 1 mmHg or lower. The resulting bulk phosphazene composition was ground by a Henschel mixer. The composition of the thus obtained phosphazene was as follows. Trimer: 97%, tetramer: 2%, other phosphazene compounds: 1%, content of K: 8 ppm, content of Na: 10 ppm, content of phosphorus: 13.4% by weight, content of chlorine: 10 ppm or less, residues at 500° C.: 2.1% by weight, and content of volatile components: 0.125% by weight. The bulk density was 0.57 g/cm³.

Example 5

FR5: 150.0 g of phenol, 100.1 g of solid potassium hydroxide and 500 ml of xylene were charged in a 2 L four-necked flask equipped with Dean Stark tube with a Dimroth condenser tube, a dropping funnel, a thermometer, and a stirrer, and refluxed with heating at an oil bath temperature of 145° C. in a nitrogen stream. Water produced was taken out of the system by azeotropy with xylene, and only the xylene was returned to the system. The refluxing with heating was carried out until distillation of the produced water terminated. Completion of the reaction required 4 hours.

The reaction vessel was dipped in an ice bath and cooled until the reaction mixture reached 10° C. or lower, and then a mixed solution of 70.3 g of chlorophosphazene oligomer and 250 ml of xylene was added dropwise to the reaction mixture over a period of 30 minutes using the dropping funnel while keeping the reaction mixture at 10° C. or lower. After the addition of the mixed solution, the reaction mixture was again heated and refluxed with heating at an oil bath temperature of 145° C. for 6 hours. The end point of the reaction was traced by $^{31}$PNMR, and the reaction was carried out until the signal originating from the halogen-substituted phosphazene compound was not observed. After completion of the reaction, the reaction mixture was cooled to 80° C., and washed twice with a 10% aqueous sodium hydroxide solution, once with dilute hydrochloric acid, and four times with water while keeping a temperature of 70–85° C. The reaction mixture was dried with anhydrous magnesium sulfate, then magnesium sulfate was removed by filtration, and the solvent was distilled off at 80° C. and under 10 mmHg or lower. The resulting crude crystals were washed with 100 ml of methanol, and dried under reduced pressure for 5 hours in an oven with a preset temperature of 105° C. under 1 mmHg or lower to obtain 118.1 g of a mixture of phenoxyphosphazene compounds. The resulting bulk phosphazene composition was ground by a Henschel mixer. The composition of the thus obtained phosphazene was as follows. Trimer: 93.6%, tetramer: 4.0%, other phosphazene compounds: 2.4%, content of K: 28 ppm, content of Na: 10 ppm, content of phosphorus: 13.5% by weight, content of chlorine: 102 ppm, residues at 500° C.: 4.3% by weight, and content of volatile components: 0.088% by weight. The bulk density was 0.49 g/cm³.

Example 6

FR6: 155.1 g of phenol, 100.0 g of solid potassium hydroxide and 500 ml of xylene were charged in a 2 L four-necked flask equipped with Dean Stark tube with a Dimroth condenser tube, a dropping funnel, a thermometer, and a stirrer, and refluxed with heating at an oil bath temperature of 145° C. Water produced was taken out of the system by azeotropy with xylene, and only the xylene was returned to the system. The refluxing with heating was carried out until distillation of the produced water terminated. Completion of the reaction required 4 hours.

The reaction vessel was dipped in an ice bath and cooled until the reaction mixture reached 10° C. or lower, and then a mixed solution of 72.2 g of chlorophosphazene oligomer and 250 ml of xylene was added dropwise to the reaction mixture over a period of 30 minutes using the dropping funnel while keeping the reaction mixture at 10° C. or lower. After the addition of the mixed solution, the reaction mixture was again heated and refluxed with heating at an oil bath temperature of 145° C. for 6 hours. The end point of the reaction was traced by $^{31}$PNMR. After completion of the reaction, the reaction mixture was cooled to 80° C., and washed twice with a 10% aqueous sodium hydroxide solution, once with dilute hydrochloric acid, and four times with water while keeping a temperature of 70–85° C. The reaction mixture was dried with anhydrous magnesium sulfate, then magnesium sulfate was removed by filtration, and the solvent was distilled off at 80° C. and under 10 mmHg or lower, followed by carrying out drying under reduced pressure for 5 hours in an oven with a preset temperature of 105° C. under 1 mmHg or lower to obtain 124.1 g of a mixture of phenoxyphosphazene compounds. The resulting bulk phosphazene composition was ground by a Henschel mixer. The composition of the thus obtained phosphazene was as follows. Trimer: 90.3%, tetramer: 4.3%, phosphazene trimer compound having one hydroxyl group in the molecule:

0.1%, monochloropentaphenoxyphosphazene trimer: 0.4%, other phosphazene compounds: 4.9%, content of K: 35 ppm, content of Na: 13 ppm, content of phosphorus: 14.1% by weight, content of chlorine: 290 ppm, residues at 500° C.: 8.6% by weight, and content of volatile components: 0.451% by weight. The bulk density was 0.57 g/cm$^3$.

Comparative Example 1

FR7: 177.0 g of phenol and 750 ml of xylene were charged in a 2 L four-necked flask equipped with Dean Stark tube with a Dimroth condenser tube, a dropping funnel, a thermometer, and a stirrer, and kept at an oil bath temperature of 145° C. in a nitrogen stream. A 40% aqueous solution prepared by dissolving 120.2 g of potassium hydroxide in purified water was added dropwise to the content in the flask over a period of 4 hours using the dropping funnel. Water in the system was successively taken out of the system by azeotropy with xylene. After completion of the addition of the aqueous potassium hydroxide solution, refluxing with heating was carried out until distillation of the produced water terminated. Completion of the reaction required 90 minutes.

The reaction vessel was dipped in an ice bath and cooled until the reaction mixture reached 10° C. or lower, and then a mixed solution of 85.1 g of chlorophosphazene oligomer and 250 ml of xylene was added dropwise to the reaction mixture over a period of 30 minutes using the dropping funnel while keeping the reaction mixture at 10° C. or lower. After the addition of the mixed solution, the reaction mixture was again heated and refluxed with heating at an oil bath temperature of 145° C. for 7 hours. The end point of the reaction was traced by $^{31}$PNMR. After completion of the reaction, the reaction mixture was cooled to 40° C. or lower and washed twice with a solution of 10% aqueous sodium hydroxide solution/methanol=7:3, once with dilute hydrochloric acid, and thrice with a solution of water/methanol=7:3. The reaction mixture was dried with anhydrous magnesium sulfate, then magnesium sulfate was removed by filtration, and the solvent was distilled off at 80° C. and under 10 mmHg or lower, followed by carrying out drying under reduced pressure for 13 hours in an oven with a preset temperature of 80° C. under 1 mmHg or lower to obtain 154 g of a mixture of phenoxyphosphazene compounds. The composition of the thus obtained phosphazene was obtained by $^{31}$PNMR. The results were as follows. Trimer: 87%, tetramer: 10%, other phosphazene compounds: 3%, content of K: 10 ppm, content of Na: 10 ppm, residues at 500° C.: 7.8% by weight, and content of volatile components: 0.017% by weight. The bulk density was 0.42 g/cm$^3$.

Comparative Example 2

FR8: 167.0 g of phenol, a 40% aqueous potassium hydroxide solution prepared by dissolving 100.1 g of potassium hydroxide in purified water, and 500 ml of xylene were charged into a 2 L four-necked flask equipped with Dean Stark tube with a Dimroth condenser tube, a dropping funnel, a thermometer, and a stirrer, and refluxed with heating at an oil bath temperature of 145° C. in a nitrogen stream. Water in the system and water produced were taken out of the system by azeotropy with xylene, and only the xylene was returned to the system. The refluxing with heating was carried out until distillation of the produced water terminated. Completion of the reaction required 8 hours.

The reaction vessel was dipped in an ice bath and cooled until the reaction mixture reached 10° C. or lower, and then a mixed solution of 80.1 g of chlorophosphazene oligomer and 250 ml of xylene was added dropwise to the reaction mixture over a period of 30 minutes using the dropping funnel while keeping the reaction mixture at 10° C. or lower. After the addition of the mixed solution, the reaction mixture was heated again and refluxed with heating at an oil bath temperature of 145° C. for 6 hours. The end point of the reaction was traced by $^{31}$PNMR. After completion of the reaction, the reaction mixture was cooled to 40° C. or lower, neutralized with dilute hydrochloric acid and washed thrice with water. The reaction mixture was dried with anhydrous magnesium sulfate, then magnesium sulfate was removed by filtration, and the solvent was distilled off at 80° C. and under 10 mmHg or lower, followed by carrying out drying under reduced pressure for 3 hours in an oven with a preset temperature of 80° C. under 1 mmHg or lower to obtain 151 g of a mixture of phenoxyphosphazene compounds. The composition of the resulting phosphazene was obtained by $^{31}$PNMR, and the results were as follows. Trimer: 81%, tetramer: 12%, phosphazene compound having one hydroxyl group in the molecule: 1%, monochloropentaphenoxyphosphazene trimer: 2%, other phosphazene compounds: 4%, content of K: 212 ppm, content of Na: 38 ppm, content of phosphorus: 14.6% by weight, content of chlorine: 2200 ppm, residues at 500° C.: 15.1% by weight, and content of volatile components: 5.12% by weight. The bulk density was 0.76 g/cm$^3$.

Comparative Example 3

FR9: 155.1 g of phenol, 100.1 g of potassium hydroxide, 25 ml of purified water, and 500 ml of monochlorobenzene were charged in a 2 L four-necked flask equipped with Dean Stark tube with a Dimroth condenser tube, a dropping funnel, a thermometer, and a stirrer, and refluxed with heating at an oil bath temperature of 145° C. Water produced was taken out of the system by azeotropy with monochlorobenzene, and only the monochlorobenzene was returned to the system. The refluxing with heating was carried out until distillation of the produced water terminated. Completion of the reaction required 7 hours.

The reaction vessel was dipped in an ice bath and cooled until the reaction mixture reached 10° C. or lower, and then a mixed solution of 72.2 g of chlorophosphazene oligomer and 250 ml of monochlorobenzene was added dropwise to the reaction mixture over a period of 30 minutes using the dropping funnel while keeping the reaction mixture at 10° C. or lower. After the addition of the mixed solution, the reaction mixture was heated again and refluxed with heating at an oil bath temperature of 145° C. for 6 hours. The end point of the reaction was traced by $^{31}$PNMR. After completion of the reaction, the reaction mixture was cooled to 50° C. or lower, and washed twice with a 10% aqueous sodium hydroxide solution, once with dilute hydrochloric acid and thrice with water. The reaction mixture was dried with anhydrous magnesium sulfate, then magnesium sulfate was removed by filtration, and the solvent was distilled off at 80° C. and under 10 mmHg or lower, followed by carrying out drying under reduced pressure at a temperature of 95° C. under 1 mmHg or lower for 5 hours to obtain 121.1 g of a mixture of phenoxyphosphazene compounds. The composition of the thus obtained phosphazene was as follows. Trimer: 62.1%, tetramer: 26.4%, phosphazene trimer compound having one hydroxyl group in the molecule: 0.8%, monochloropentaphenoxyphosphazene trimer: 1.2%, other phosphazene compounds: 9.5%, content of K: 126 ppm, content of Na: 31 ppm, content of phosphorus: 14.3%, content of chlorine: 1270 ppm, residues at 500° C.: 18.2% by weight, and content of volatile components: 1.24% by weight. The bulk density was 0.62 g/cm$^3$.

Application Examples

The contents of water before and after absorption of moisture in the phosphazene compositions obtained in Examples 1–4 and Comparative Examples 1, 2 were measured, respectively. The results are as shown in Table 1, wherein the contents of volatile components of these phosphazene compositions are shown with the above results, respectively.

Examples 7–10 and Comparative Examples 4 and 5

11% by weight of each of the phosphazene compositions obtained in Examples 1–4 and Comparative Examples 1, 2, 39% by weight of HIPS and 50% by weight of PPE were mixed, and the resultant mixture was fed to a twin-screw extruder of 25 mm in screw diameter whose maximum temperature of its heating cylinder was set at 300° C. and melt mixed at a screw revolution rate of 300 rpm, and the strands were cooled and cut to obtain pellets of resin composition. Then, the resulting pellets were molded to prepare test pieces for UL-94 test and test pieces for measurement of electric characteristics by injection molding at a cylinder preset temperature of 280° C. and a mold temperature of 80° C., and physical property tests were conducted by the test methods mentioned above to obtain the results as shown in Table 1.

It can be seen from the results of Table 1 that the phosphazene compositions having a content of volatile component in the range of the present invention have a small in change of electric characteristics before and after absorption of moisture and show good flame retardancy.

Examples 11–15

FR2 (i.e. the phosphazene composition obtained in Example 2) was ground by a Henschel mixer, and phosphazene compositions differing in bulk density were obtained by changing the grinding time. The resulting phosphazene compositions were subjected to moisture absorption for 6 hours in the same manner as in Examples 7–10, and the water content before and after the moisture absorption was measured.

TABLE 1

|  |  | Example 7 | Example 8 | Example 9 | Example 10 | Comparative Example 4 | Comparative Example 5 |
|---|---|---|---|---|---|---|---|
| Phosphazene composition | | FR1 | FR2 | FR3 | FR4 | FR7 | FR8 |
| Content of volatile component/% | | 0.174 | 0.225 | 0.586 | 0.125 | 0.017 | 5.12 |
| Before moisture absorption (A)/ppm | | 101 | 180 | 155 | 75 | 37 | 326 |
| After moisture absorption (B)/ppm | | 499 | 452 | 612 | 540 | 1498 | 862 |
| Change in amount (B − A) | | 398 | 272 | 457 | 465 | 1461 | 536 |
| Resin composition | | | | | | | |
| Dielectric constant | Before moisture absorption | 2.64 | 2.64 | 2.65 | 2.64 | 2.63 | 2.67 |
| | After moisture absorption | 2.66 | 2.66 | 2.67 | 2.66 | 2.69 | 2.69 |
| | Δ | 0.02 | 0.02 | 0.02 | 0.02 | 0.06 | 0.02 |
| Dielectric loss tangent | Before moisture absorption | 0.0027 | 0.0028 | 0.0029 | 0.0027 | 0.0027 | 0.003 |
| | After moisture absorption | 0.0037 | 0.0036 | 0.0038 | 0.0035 | 0.0034 | 0.0064 |
| | Δ | 0.001 | 0.0008 | 0.0009 | 0.0008 | 0.0007 | 0.0034 |
| Flame retardancy UL-94 | | V-0 | V-0 | V-0 | V-0 | V-0 | V-1 |

TABLE 2

|  | Example 11 | Example 12 | Example 13 | Example 14 | Example 15 |
|---|---|---|---|---|---|
| Bulk density g/cm$^3$ | 0.47 | 0.53 | 0.45 | 0.61 | 0.33 |
| Before moisture absorption (A)/ppm | 180 | 176 | 188 | 170 | 163 |
| After moisture absorption (B)/ppm | 452 | 488 | 486 | 522 | 769 |
| Change in amount (B − A) | 272 | 312 | 298 | 352 | 606 |

It can be seen from the results of Table 2 that the phosphazene compositions having a bulk density of 0.45 g/cm$^3$ or higher are especially high in moisture absorption resistance.

Examples 16–22 and Comparative Examples 6–8

The weight retentions and the contents of water before and after absorption of moisture in the phosphazene compositions obtained in Examples 1, 2, 5, 6 and Comparative Examples 2, 3 were measured, respectively. The results are as shown in Tables 3 and 4, wherein the bulk densities and the contents of volatile components of these phosphazene compositions are shown with the above results, respectively.

Furthermore, the components were mixed at the ratio as shown below, and the resulting mixture was fed to a twin-screw extruder of 25 mm in screw diameter whose maximum temperature of its heating cylinder was set at 300° C. and melt mixed at a screw revolution rate of 300 rpm, and the strands were cooled and cut to obtain pellets of resin composition. Then, the resulting pellets of the resin composition were molded by injection molding at a cylinder preset temperature of 240–290° C. to prepare pieces for testing of physical properties, and physical property tests were conducted by the test methods mentioned above to obtain the results as shown in Table 3 and Table 4.

TABLE 3

|  |  | Example 16 | Example 17 | Example 18 | Example 19 | Comparative Example 6 |
|---|---|---|---|---|---|---|
| Phosphazene composition |  | FR1 | FR2 | FR5 | FR6 | FR8 |
| Content of volatile component | wt % | 0.174 | 0.225 | 0.088 | 0.451 | 5.12 |
| Before moisture absorption (A) | ppm | 101 | 180 | 127 | 178 | 326 |
| After moisture absorption (B) | ppm | 499 | 452 | 433 | 584 | 862 |
| Change in amount (B − A) | ppm | 398 | 272 | 306 | 406 | 536 |
| Bulk density | g/cm$^3$ | 0.47 | 0.53 | 0.49 | 0.57 | 0.76 |
| Weight retention | wt % | 2.2 | 6.3 | 4.3 | 8.6 | 15.1 |
| Resin composition |  |  |  |  |  |  |
| Flame retardancy | UL-94 | V-0 | V-0 | V-0 | V-0 | V-1 |
| MFR | g/10 min | 8.8 | 8.1 | 8.2 | 7.9 | 6.2 |

Resin composition: PPE/HIPS/phosphazene composition=55/33/12 (% by weight).

TABLE 4

|  |  | Example 20 | Example 21 | Example 22 | Comparative Example 7 | Comparative Example 8 |
|---|---|---|---|---|---|---|
| Phosphazene composition |  | FR1 | FR2 | FR5 | FR9 | FR8 |
| Content of volatile component | wt % | 0.174 | 0.225 | 0.088 | 1.24 | 5.12 |
| Before moisture absorption (A) | ppm | 101 | 180 | 127 | 289 | 326 |
| After moisture absorption (B) | ppm | 499 | 452 | 433 | 769 | 862 |
| Change in amount (B − A) | ppm | 398 | 272 | 306 | 480 | 536 |
| Bulk density | g/cm$^3$ | 0.47 | 0.53 | 0.49 | 0.62 | 0.76 |
| Weight retention | wt % | 2.2 | 6.3 | 4.3 | 18.2 | 15.1 |
| Resin composition |  |  |  |  |  |  |
| Flame retardancy | UL-94 | V-0 | V-0 | V-0 | V-1 | V-2 |
| MFR | g/10 min | 30.2 | 29 | 28.9 | 23.4 | 20.6 |

Resin composition: PPE/HIPS/phosphazene composition=40/45/15 (% by weight).

It can be seen from the results of Tables 3 and 4 that the compositions low in the amount of residues at 500° C. in TGA show especially good processing fluidity and flame retardancy.

Examples 23–26 and Comparative Examples 9–11

The contents of water before and after absorption of moisture in the phosphazene compositions obtained in Examples 1, 2, 4, 5 and Comparative Examples 1–3 were measured, respectively. The results are as shown in Tables 5 and 6, wherein the contents of volatile components of these phosphazene compositions are shown with the above results, respectively.

Furthermore, 71.0% by weight of AER250 and 16.0% by weight of phosphazene composition were melted at 110° C., and then 13.0% by weight of a hardener was added thereto at 110° C., followed by heating the mixture for 90 seconds under stirring and then pouring the mixture into a mold.

Then, the content in the mold was hardened for 2 minutes at 100° C./0 kgf/cm$^2$, for 2 minutes at 100° C./10 kgf/cm$^2$, for 30 minutes at 100° C./40 kgf/cm$^2$ by a hot press to obtain a molded piece for measurement of moisture resistance. The results of the measurement of moisture resistance are shown in Table 5 and Table 6.

Comparative Example 12

84.5% by weight of AER250 was kept at 110° C., and 15.5% by weight of a hardener was added thereto, followed by heating the mixture for 90 seconds under stirring and then pouring the mixture into a mold.

Then, the content in the mold was hardened for 2 minutes at 100° C./0 kgf/cm$^2$, for 2 minutes at 100° C./10 kgf/cm$^2$, for 30 minutes at 100° C./40 kgf/cm$^2$ by a hot press to obtain a molded piece for measurement of moisture resistance. The results of the measurement of moisture resistance are shown in Table 6.

INDUSTRIAL APPLICABILITY

A phosphazene composition which has a content of volatile component of not less than 0.02% by weight and not more than 1.0% by weight when it is heated at 200° C. for 2 hours does not contain chlorine compounds and bromine compounds. When the phosphazene composition is added to a resin, there is provided a resin composition which can maintain highly balanced resistance to hydrolysis, flame retardancy and stability of electric characteristics in a high-frequency field of not less than 1 GHz.

What is claimed is:

1. A phosphazene composition comprising at least one phosphazene compound, wherein the phosphazene composition has a content of volatile components originated therein of not less than 0.02% by weight and not more than 1.0% by weight based on the total weight of the phosphazene composition when it is heated at 200° C. for 2 hours, and wherein the composition has a weight retention according to TGA of not higher than 15% by weight at 500° C. when it is heated from room temperature to 600° C. at a heating rate of 10° C./min in an inert gas atmosphere.

2. A phosphazene composition according to claim 1 which has a water content of not more than 1000 ppm measured by Karl Fischer's method at 150° C.

3. A phosphazene composition according to claim 1 which has a water content of not more than 650 ppm measured by Karl Fischer's method at 150° C.

4. A phosphazene composition according to claim 1 which contains not less than 95% by weight of cyclic phosphazene compounds based on the total weight of the phosphazene composition.

TABLE 5

|  | Example 23 | Example 24 | Example 25 | Example 26 | Comparative Example 9 |
| --- | --- | --- | --- | --- | --- |
| Phosphazene composition | FR1 | FR2 | FR4 | FR5 | FR9 |
| Content of volatile component/% | 0.174 | 0.225 | 0.125 | 0.088 | 1.24 |
| Before moisture absorption (A)/ppm | 101 | 180 | 75 | 127 | 289 |
| After moisture absorption (B)/ppm | 499 | 452 | 540 | 433 | 769 |
| Change in amount (B − A) | 398 | 272 | 465 | 306 | 480 |
| Resin composition |  |  |  |  |  |
| Water absorption rate/% | 1.69 | 1.65 | 1.71 | 1.66 | 1.72 |
| Color stability | ○ | ○ | ○ | ○ | x |

TABLE 6

|  | Comparative Example 10 | Comparative Example 11 | Comparative Example 12 |
| --- | --- | --- | --- |
| Phosphazene composition | FR7 | FR8 | — |
| Content of volatile component/% | 0.017 | 5.12 | — |
| Before moisture absorption (A)/ppm | 37 | 326 | — |
| After moisture absorption (B)/ppm | 1498 | 862 | — |
| Change in amount (B-A) | 1461 | 536 | — |
| Resin composition |  |  |  |
| Water absorption rate/% | 1.92 | 1.81 | 2.06 |
| Color stability | ○ | X | ○ |

5. A phosphazene composition according to claim 1 which has a content of one or more residual alkali metal elements of not more than 100 ppm, a content of compounds having a P—OH bond of not more than 1% by weight and a chlorine content of not more than 1000 ppm based on the total weight of the phosphazene composition.

6. A phosphazene composition according to claim 1 which has a content of one or more residual alkali metal elements of not more than 50 ppm, a content of compounds having a P—OH bond of not more than 1% by weight and a chlorine content of not more than 500 ppm based on the total weight of the phosphazene composition.

7. A phosphazene composition according to claim 1, wherein the phosphaze compound has not less than 90% of phenoxy groups as the substituents based on all the substituents and the phosphazene composition has a phosphorus content of 13.0–14.5% by weight based on the total weight of the phosphazene composition.

8. A phosphazene composition according to claim 1 which has a weight retention according to TGA of not higher than 10% by weight at 500° C. when it is heated from room temperature to 600° C. at a heating rate of 10° C./min in an inert gas atmosphere.

9. A phosphazene composition according to claim 1 which has a bulk density of not lower than 0.45 g/cm$^3$.

10. A flame retardant resin composition which comprises a resin and a phosphazene composition according to any one of claims 1–9.

11. A flame retardant resin composition according to claim 10, wherein the resin comprises at least one hardening resin selected from the group consisting of unsaturated polyester resins, vinyl ester resins, diallyl phthalate resins, epoxy resins, cyanate resins, xylene resins, triazine resins, phenolic resins, urea resins, melamine resins, benzoguanamine resins, urethane resins, ketone resins, alkyd resins, furan resins, styrylpyridine resins, silicone resins and synthetic rubbers.

12. A flame retardant resin composition according to claim 10, wherein the resin comprises at least one thermoplastic resin selected from the group consisting of polycarbonates, polyphenylene ethers, polyphenylene sulfides, polypropylenes, polyethylenes, polystyrenes, ABS resins, polyalkylene terephthalates, polyamides, thermotropic liquid crystals and elastomer-containing polystyrenes.

13. A flame retardant resin composition according to claim 10 which has a concentration of phosphorus of 0.5–8.0% by weight.

14. A flame retardant resin composition according to claim 10 which is used for parts or casings of electric and electronic equipment used in a high-frequency field of not less than 1 GHz.

15. A phosphazene composition according to claim 1, wherein said at least one phosphazerie compound contains cyclic trimer and/or tetramer compounds in an amount of not less than 80% by weight.

16. A flame retardant resin composition which comprises a resin and a phosphazene corn position according to claim 15.

* * * * *